US008438578B2

(12) United States Patent
Hoover et al.

(10) Patent No.: US 8,438,578 B2
(45) Date of Patent: May 7, 2013

(54) NETWORK ON CHIP WITH AN I/O ACCELERATOR

(75) Inventors: Russell D. Hoover, Rochester, MN (US); Jon K. Kriegel, Rochester, MN (US); Eric O. Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 12/135,364

(22) Filed: Jun. 9, 2008

(65) Prior Publication Data

US 2009/0307714 A1 Dec. 10, 2009

(51) Int. Cl.
*G06F 3/00* (2006.01)
*G06F 9/44* (2006.01)
*G06F 9/46* (2006.01)
*G06F 13/00* (2006.01)
*G06F 15/00* (2006.01)

(52) U.S. Cl.
USPC .............................. 719/313; 719/320; 712/32

(58) Field of Classification Search .................. None
See application file for complete search history.

(56) References Cited

U.S. PATENT DOCUMENTS

| | | |
|---|---|---|
| 4,813,037 A | 3/1989 | Debuysscher et al. |
| 4,951,195 A | 8/1990 | Fogg et al. |
| 5,167,023 A | 11/1992 | De Nicolas et al. |
| 5,301,302 A | 4/1994 | Blackard et al. |
| 5,442,797 A | 8/1995 | Casavant et al. |
| 5,590,308 A | 12/1996 | Shih |
| 5,761,516 A | 6/1998 | Rostoker et al. |
| 5,784,706 A | 7/1998 | Oberlin et al. |
| 5,870,479 A | 2/1999 | Feiken et al. |
| 5,872,963 A | 2/1999 | Bitar et al. |
| 5,884,060 A | 3/1999 | Vegesna et al. |
| 5,887,166 A | 3/1999 | Mallick et al. |
| 5,974,498 A | 10/1999 | Hopkins |
| 6,021,470 A | 2/2000 | Frank et al. |
| 6,044,478 A | 3/2000 | Green |
| 6,047,122 A | 4/2000 | Spiller |
| 6,049,866 A | 4/2000 | Earl |
| 6,085,296 A | 7/2000 | Karkhanis et al. |

(Continued)

OTHER PUBLICATIONS

"Parallel Computing", Wikipedia, http://en.wikipedia.org/wiki/Parallel_computing, Jan. 19, 2007. pp. 1-6.*

(Continued)

*Primary Examiner* — S. Sough
*Assistant Examiner* — Craig Dorais
(74) *Attorney, Agent, or Firm* — Biggers & Ohanian, LLP

(57) ABSTRACT

Data processing on a network on chip ('NOC') that includes IP blocks, routers, memory communications controllers, and network interface controllers; each IP block adapted to a router through a memory communications controller and a network interface controller; each memory communications controller controlling communication between an IP block and memory; each network interface controller controlling inter-IP block communications through routers; each IP block adapted to the network by a low latency, high bandwidth application messaging interconnect comprising an inbox and an outbox; a computer software application segmented into stages, each stage comprising a flexibly configurable module of computer program instructions identified by a stage ID with each stage executing on a thread of execution on an IP block; and at least one of the IP blocks comprising an input/output ('I/O') accelerator that administers at least some data communications traffic to and from the at least one IP block.

18 Claims, 9 Drawing Sheets

U.S. PATENT DOCUMENTS

| | | | |
|---|---|---|---|
| 6,085,315 A | 7/2000 | Fleck et al. | |
| 6,092,159 A | 7/2000 | Ekner et al. | |
| 6,101,599 A | 8/2000 | Wright et al. | |
| 6,105,119 A | 8/2000 | Kerr et al. | |
| 6,119,215 A | 9/2000 | Key et al. | |
| 6,145,072 A | 11/2000 | Shams et al. | |
| 6,151,668 A | 11/2000 | Pechanek et al. | |
| 6,164,841 A | 12/2000 | Mattson et al. | |
| 6,272,598 B1 | 8/2001 | Arlitt et al. | |
| 6,292,888 B1 | 9/2001 | Nemirovsky et al. | |
| 6,370,622 B1 | 4/2002 | Chiou et al. | |
| 6,385,695 B1 | 5/2002 | Arimilli et al. | |
| 6,434,669 B1 | 8/2002 | Arimilli et al. | |
| 6,446,171 B1 | 9/2002 | Henriksen | |
| 6,493,817 B1 | 12/2002 | Renstrom | |
| 6,519,605 B1 | 2/2003 | Gilgen et al. | |
| 6,561,895 B2 | 5/2003 | Scales | |
| 6,567,895 B2 | 5/2003 | Scales | |
| 6,591,347 B2 | 7/2003 | Tischler et al. | |
| 6,625,662 B1 | 9/2003 | Satoh et al. | |
| 6,668,307 B1 | 12/2003 | Damron | |
| 6,668,308 B2 | 12/2003 | Barroso et al. | |
| 6,675,284 B1 | 1/2004 | Warren | |
| 6,697,932 B1 | 2/2004 | Yoaz et al. | |
| 6,725,317 B1 | 4/2004 | Bouchier et al. | |
| 6,823,429 B1 | 11/2004 | Olnowich | |
| 6,832,184 B1 | 12/2004 | Bleier et al. | |
| 6,877,086 B1 | 4/2005 | Boggs et al. | |
| 6,891,828 B2 | 5/2005 | Ngai | |
| 6,898,791 B1 | 5/2005 | Chandy et al. | |
| 6,915,402 B2 | 7/2005 | Wilson et al. | |
| 6,938,253 B2 | 8/2005 | Kim | |
| 6,950,438 B1 | 9/2005 | Owen et al. | |
| 6,973,032 B1 | 12/2005 | Casley et al. | |
| 6,988,149 B2 | 1/2006 | Odenwald | |
| 7,010,580 B1 | 3/2006 | Fu et al. | |
| 7,015,909 B1 | 3/2006 | Morgan, III et al. | |
| 7,072,996 B2 | 7/2006 | Adusumilli et al. | |
| 7,162,560 B2 | 1/2007 | Taylor et al. | |
| 7,376,789 B2 | 5/2008 | Halleck et al. | |
| 7,394,288 B1 | 7/2008 | Agarwal | |
| 7,398,374 B2 | 7/2008 | DeLano | |
| 7,464,197 B2 | 12/2008 | Ganapathy et al. | |
| 7,478,225 B1 | 1/2009 | Brooks et al. | |
| 7,493,474 B1 | 2/2009 | Pechanek et al. | |
| 7,500,060 B1 | 3/2009 | Anderson et al. | |
| 7,502,378 B2 | 3/2009 | Lajolo et al. | |
| 7,521,961 B1 | 4/2009 | Anderson et al. | |
| 7,533,154 B1 | 5/2009 | Chen et al. | |
| 7,539,124 B2 | 5/2009 | Rhim et al. | |
| 7,546,444 B1 | 6/2009 | Wolrich et al. | |
| 7,568,064 B2 | 7/2009 | Reblewski et al. | |
| 7,590,774 B2 | 9/2009 | Johns et al. | |
| 7,613,882 B1 | 11/2009 | Akkawi et al. | |
| 7,664,108 B2 | 2/2010 | Bahattab | |
| 7,689,738 B1 | 3/2010 | Williams et al. | |
| 7,701,252 B1 | 4/2010 | Chow et al. | |
| 7,861,065 B2 | 12/2010 | Heil et al. | |
| 7,882,307 B1 | 2/2011 | Wentzlaff et al. | |
| 7,886,084 B2 * | 2/2011 | Chen et al. | 710/22 |
| 7,913,010 B2 | 3/2011 | Hoover et al. | |
| 7,917,703 B2 | 3/2011 | Comparan et al. | |
| 7,958,340 B2 | 6/2011 | Hoover et al. | |
| 7,991,978 B2 | 8/2011 | Kuesel et al. | |
| 8,010,750 B2 | 8/2011 | Comparan et al. | |
| 8,018,466 B2 | 9/2011 | Hoover et al. | |
| 8,020,168 B2 | 9/2011 | Hoover et al. | |
| 8,040,799 B2 | 10/2011 | Hoover et al. | |
| 2002/0099833 A1 | 7/2002 | Steely et al. | |
| 2002/0178337 A1 | 11/2002 | Wilson et al. | |
| 2003/0065890 A1 | 4/2003 | Lyon | |
| 2004/0037313 A1 | 2/2004 | Gulati et al. | |
| 2004/0083341 A1 | 4/2004 | Robinson et al. | |
| 2004/0088487 A1 | 5/2004 | Barroso et al. | |
| 2004/0111422 A1 | 6/2004 | Devarakonda et al. | |
| 2004/0151197 A1 | 8/2004 | Hui | |
| 2004/0153579 A1 | 8/2004 | Shih et al. | |
| 2004/0216105 A1 | 10/2004 | Burky et al. | |
| 2004/0250046 A1 | 12/2004 | Gonzalez et al. | |
| 2004/0260906 A1 | 12/2004 | Landin et al. | |
| 2005/0044319 A1 * | 2/2005 | Olukotun | 711/118 |
| 2005/0066205 A1 | 3/2005 | Holmer | |
| 2005/0086435 A1 | 4/2005 | Todoroki | |
| 2005/0097184 A1 | 5/2005 | Brown et al. | |
| 2005/0149689 A1 | 7/2005 | Sodani et al. | |
| 2005/0160209 A1 | 7/2005 | Van Doren et al. | |
| 2005/0166205 A1 | 7/2005 | Oskin et al. | |
| 2005/0198442 A1 | 9/2005 | Mandler | |
| 2005/0203988 A1 | 9/2005 | Nollet et al. | |
| 2005/0228952 A1 | 10/2005 | Mayhew et al. | |
| 2005/0238035 A1 | 10/2005 | Riley | |
| 2006/0095920 A1 * | 5/2006 | Goossens | 719/313 |
| 2006/0101249 A1 | 5/2006 | Bacon et al. | |
| 2006/0203825 A1 | 9/2006 | Beigne et al. | |
| 2006/0209846 A1 | 9/2006 | Clermidy et al. | |
| 2006/0242393 A1 | 10/2006 | Park et al. | |
| 2007/0055826 A1 | 3/2007 | Morton et al. | |
| 2007/0055961 A1 | 3/2007 | Callister et al. | |
| 2007/0074191 A1 | 3/2007 | Geisinger | |
| 2007/0076739 A1 | 4/2007 | Manjeshwar et al. | |
| 2007/0180310 A1 | 8/2007 | Johnson et al. | |
| 2007/0226407 A1 | 9/2007 | Radulescu et al. | |
| 2007/0271557 A1 | 11/2007 | Geisinger | |
| 2007/0283324 A1 | 12/2007 | Geisinger | |
| 2008/0018115 A1 | 1/2008 | Orlov | |
| 2008/0028401 A1 | 1/2008 | Geisinger | |
| 2008/0133885 A1 | 6/2008 | Glew | |
| 2008/0134191 A1 | 6/2008 | Warrier et al. | |
| 2008/0181115 A1 | 7/2008 | Soulie et al. | |
| 2008/0186998 A1 | 8/2008 | Rijpkema | |
| 2008/0205432 A1 | 8/2008 | Gangwal | |
| 2008/0216073 A1 | 9/2008 | Yates et al. | |
| 2008/0307422 A1 | 12/2008 | Kurland et al. | |
| 2008/0320235 A1 | 12/2008 | Beckmann et al. | |
| 2009/0019190 A1 | 1/2009 | Blocksome | |
| 2009/0083263 A1 | 3/2009 | Felch et al. | |
| 2009/0122703 A1 | 5/2009 | Gangwal et al. | |
| 2009/0125574 A1 | 5/2009 | Mejdrich et al. | |
| 2009/0125703 A1 | 5/2009 | Mejdrich et al. | |
| 2009/0125703 A1 | 5/2009 | Mejdrich et al. | |
| 2009/0125706 A1 | 5/2009 | Hoover et al. | |
| 2009/0135739 A1 | 5/2009 | Hoover et al. | |
| 2009/0213863 A1 | 8/2009 | Denteneer et al. | |
| 2009/0231349 A1 | 9/2009 | Mejdrich et al. | |
| 2009/0260013 A1 | 10/2009 | Heil et al. | |
| 2009/0282222 A1 | 11/2009 | Hoover et al. | |

OTHER PUBLICATIONS

Partha Pande et al., "Performance Evaluation and Design Trade-Offs for Network-on-Chip Interconnect Architectures", IEEE Transactions on Computers, vol. 54 No. 8, Aug. 2005. pp. 1025-1040.*
Final Office Action, U.S. Appl. No. 11/926,212, May 17, 2011.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
Office Action Dated Jan. 29, 2010 in U.S. Appl. No. 11/945,396.
Final Office Action Dated Jan. 15, 2010 in U.S. Appl. No. 12/031,733.
Office Action, U.S. Appl. No. 11/926,212, Dec. 7, 2010.
Office Action, U.S. Appl. No. 11/945,396, Dec. 9, 2010.
Notice of Allowance, U.S. Appl. No. 11/955,553, Nov. 22, 2010.

Notice of Allowance, U.S. Appl. No. 12/031,733, Nov. 16, 2010.
Office Action, U.S. Appl. No. 12/118,017, Dec. 8, 2010.
Office Action, U.S. Appl. No. 12/118,272, Dec. 2, 2010.
Office Action, U.S. Appl. No. 12/108,846, Dec. 2, 2010.
Final Office Action, U.S. Appl. No. 12/117,875, Nov. 10, 2010.
Office Action, U.S. Appl. No. 12/117,906, May 9, 2008.
Office Action, U.S. Appl. No. 12/060,559, Nov. 3, 2010.
Advisory Action, U.S. Appl. No. 11/926,212, Nov. 2, 2010.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Office Action, U.S. Appl. No. 11/945,396, Mar. 3, 2011.
Final Office Action, U.S. Appl. No. 12/118,017, Mar. 28, 2011.
Final Office Action, U.S. Appl. No. 11/937,579, Feb. 23, 2011.
Office Action, U.S. Appl. No. 12/108,770, Apr. 12, 2011.
Final Office Action, U.S. Appl. No. 12/117,906, Mar. 28, 2011.
Office Action, U.S. Appl. No. 12/060,559, Apr. 1, 2011.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Final Office Action, U.S. Appl. No. 11/926,212, Aug. 23, 2010.
Final Office Action, U.S. Appl. No. 11/955,553, Sep. 13, 2010.
Final Office Action, U.S. Appl. No. 12,031,733, Aug. 19, 2010.
Notice of Allowance, U.S. Appl. No. 12/118,298, Aug. 18, 2010.
Office Action, U.S. Appl. No. 11/972,753, Oct. 4, 2010.
Office Action, U.S. Appl. No. 12/015,975, Jul. 22, 2010.
Office Action, U.S. Appl. No. 11/937,579, Sep. 16, 2010.
Office Action, U.S. Appl. No. 12/118,059, Sep. 1, 2010.
Office Action, U.S. Appl. No. 12/121,168, Oct. 5, 2010.
Final Office Action, U.S. Appl. No. 11/972,753, Feb. 18, 2011.
Final Office Action, U.S. Appl. No. 12/015,975, Jan. 7, 2011.
Final Office Action, U.S. Appl. No. 12/108,846, Feb. 17, 2011.
Final Office Action, U.S. Appl. No. 12/113,286, Feb. 18, 2011.
Final Office Action, U.S. Appl. No. 12,118,059, Feb. 17, 2011.
Kumar et al.; "A Network on Chip Architecture and Design Methodology";2002; IEEE.
Final Office Action, U.S. Appl. No. 11/945,396, Sep. 1, 2011.
Final Office Action, U.S. Appl. No. 11/972,753, Sep. 7, 2011.
Office Action, U.S. Appl. No. 12/135,364, Aug. 5, 2011.
Office Action, U.S. Appl. No. 12/102,033, Oct. 7, 2011.
Office Action, U.S. Appl. No. 11/937,579, Aug. 15, 2011.
Office Action, U.S. Appl. No. 12/233,180, Oct. 6, 2011.
Office Action, U.S. Appl. No. 12/121,222, Sep. 20, 2011.
Final Office Action, U.S. Appl. No. 12/108,770, Sep. 30, 2011.
Office Action, U.S. Appl. No. 11/936,873, Jul. 21, 2011.
Office Action, U.S. Appl. No. 12,031,738, Jul. 11, 2011.
Final Office Action, U.S. Appl. No. 12/060,559, Jul. 8, 2011.
Advisory Action, U.S. Appl. No. 11/945,396, Mar. 21, 2012.
RCE, U.S. Appl. No. 11/936,873, filed Mar. 16, 2012.
Advisory Action, U.S. Appl. No. 12/118,315, Mar. 27, 2012.
Office Action, U.S. Appl. No. 11/972,753, Jan. 19, 2012.
Final Office Action, U.S. Appl. No. 12/135,364, Jan. 26, 2012.
Final Office Action, U.S. Appl. No. 11/937,579, Jan. 19, 2012.
Notice of Allowance, U.S. Appl. No. 12/233,180, Feb. 3, 2012.
Notice of Allowance, U.S. Appl. No. 12/121,222, Feb. 3, 2012.
Notice of Allowance, U.S. Appl. No. 12/118,039, Feb. 23, 2012.
Office Action, U.S. Appl. No. 12/113,286, Feb. 17, 2012.
Final Office Action, U.S. Appl. No. 11/945,396, Jul. 19, 2012.
Final Office Action, U.S. Appl. No. 12/972,753, Jul. 22, 2012.
RCE, U.S. Appl. No. 12/102,033, Jun. 21, 2012.
Office Action, U.S. Appl. No. 12/113,286, Jul. 19, 2012.
Hansson et al. "Avoiding Message-Dependent Deadlock in Network-Based Systems on Chip", Jan. 6-10, 2007, vol. 2007, 10 pages.
Notice of Allowance, U.S. Appl. No. 11/972,753, Sep. 28, 2012.
Office Action, U.S. Appl. No. 12/031,738, Aug. 20, 2012.
Office Action, U.S. Appl. No. 12/118,059, Aug. 14, 2012.
Notice of Allowance, U.S. Appl. No. 11/945,396, Oct. 23, 2012.
Notice of Allowance, U.S. Appl. No. 12/118,017, Oct. 30, 2012.
Notice of Allowance, U.S. Appl. No. 12/113,286, Dec. 12, 2012.
RCE, U.S. Appl. No. 12/102,033, filed Jun. 21, 2012.

* cited by examiner

NETWORK ON CHIP WITH AN I/O ACCELERATOR

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing: multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods and apparatus for data processing on a network on chip ('NOC') that includes IP blocks, routers, memory communications controllers, and network interface controllers; each IP block adapted to a router through a memory communications controller and a network interface controller; each memory communications controller controlling communication between an IP block and memory; each network interface controller controlling inter-IP block communications through routers; each IP block adapted to the network by a low latency, high bandwidth application messaging interconnect comprising an inbox and an outbox; a computer software application segmented into stages, each stage comprising a flexibly configurable module of computer program instructions identified by a stage ID with each stage executing on a thread of execution on an IP block; and at least one of the IP blocks comprising an input/output ('I/O') accelerator that administers at least some data communications traffic to and from the at least one IP block.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXEMPLARY EMBODIMENTS

Figure 1:
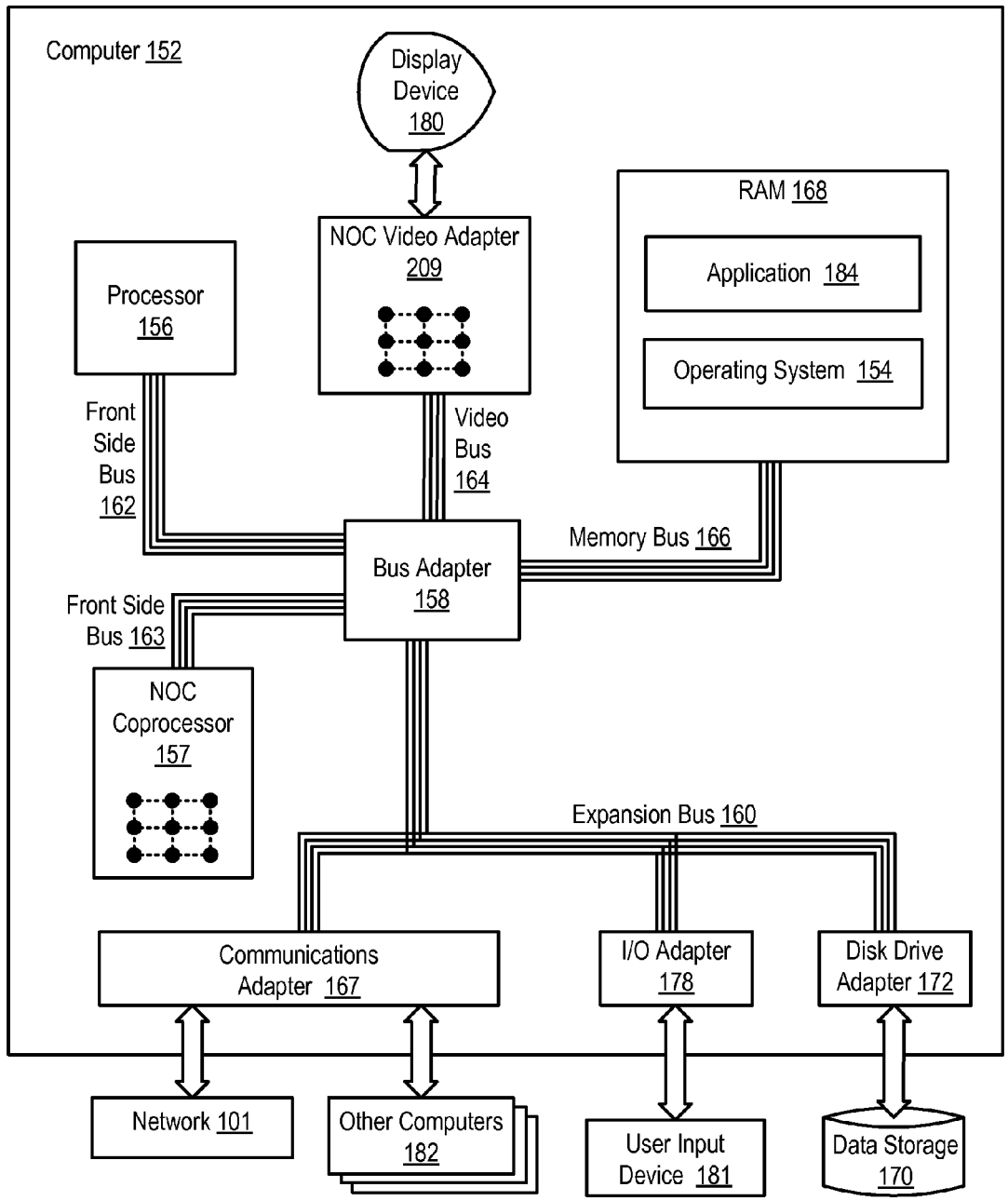
FIG. 1 sets forth a block diagram of automated computing machinery comprising an example computer useful in data processing with a NOC according to embodiments of the present invention.

Example apparatus and methods for data processing with a NOC in accordance with the present invention are described with reference to the accompanying drawings, beginning with FIG. 1. FIG. 1 sets forth a block diagram of automated computing machinery comprising an example computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. Each IP block is also adapted to the network by a low latency, high bandwidth application messaging interconnect comprising an inbox and an outbox. The NOC video adapter and the NOC coprocessor are optimized for programs that use parallel processing and also require fast random access to shared memory. The details of the NOC structure and operation are discussed below with reference to FIGS. 2-6.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
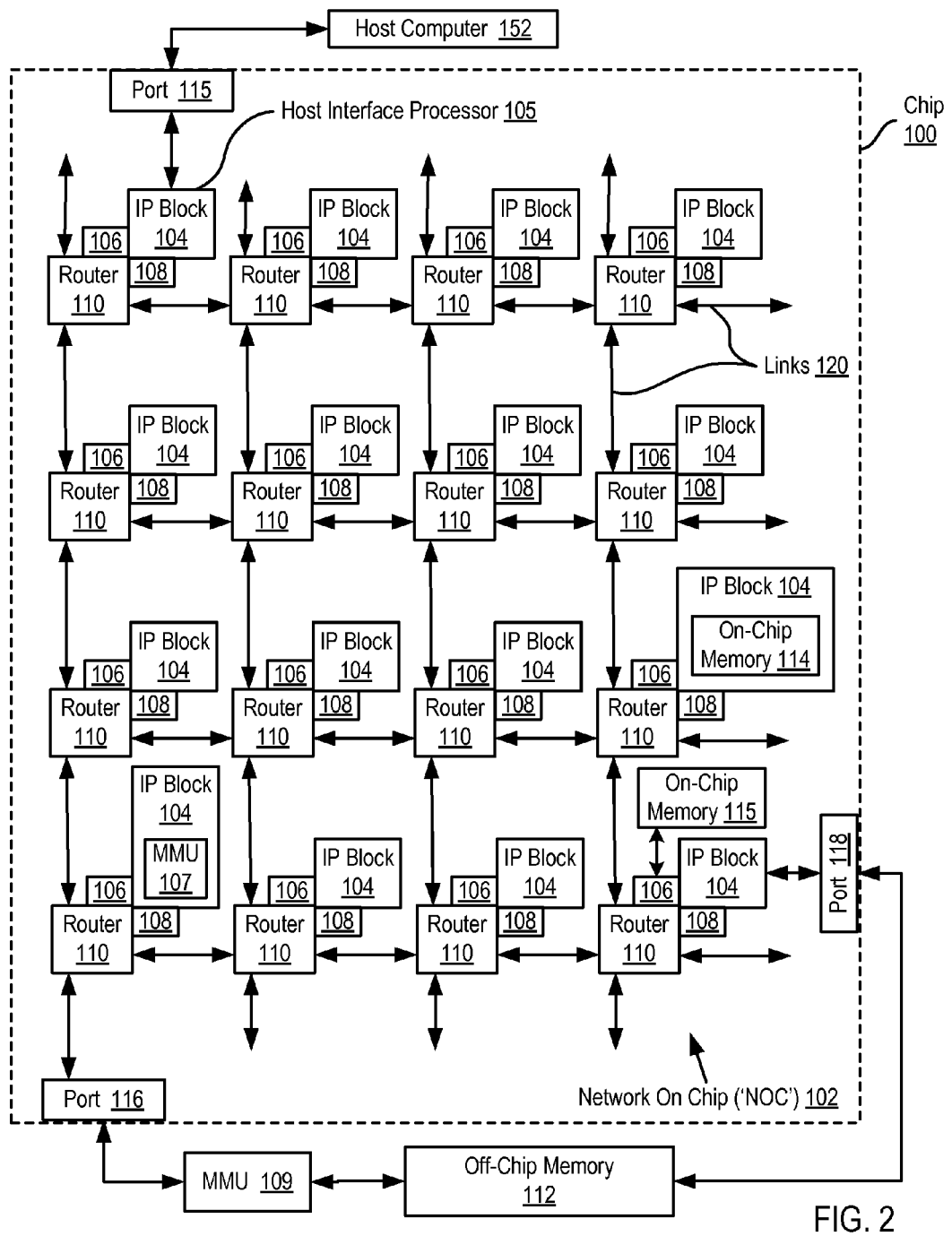
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

In the example of FIG. 2, each IP block includes a low latency, high bandwidth application messaging interconnect (107) that adapts the IP block to the network for purposes of data communications among IP blocks. As described in more detail below, each such messaging interconnect includes an inbox and an outbox.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bidirectional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (103, 109), illustrating two alternative memory architectures for NOCs according to embodiments of the present invention. MMU (103) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (103, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
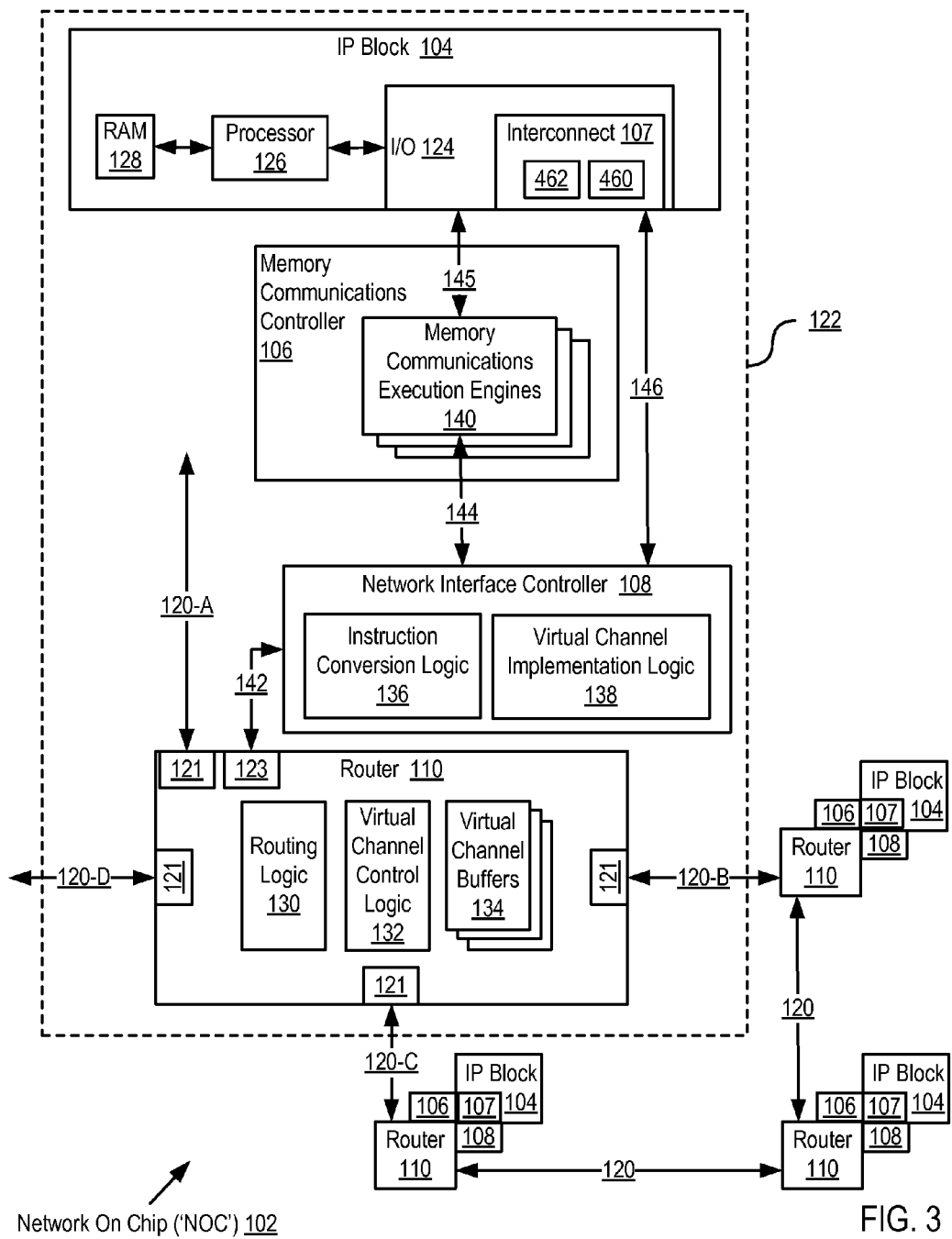
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the example of FIG. 3, each IP block includes a low latency, high bandwidth application messaging interconnect (107) that adapts the IP block to the network for purposes of data communications among IP blocks. As described in more detail below, each such messaging interconnect includes an inbox (460) and an outbox (462).

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
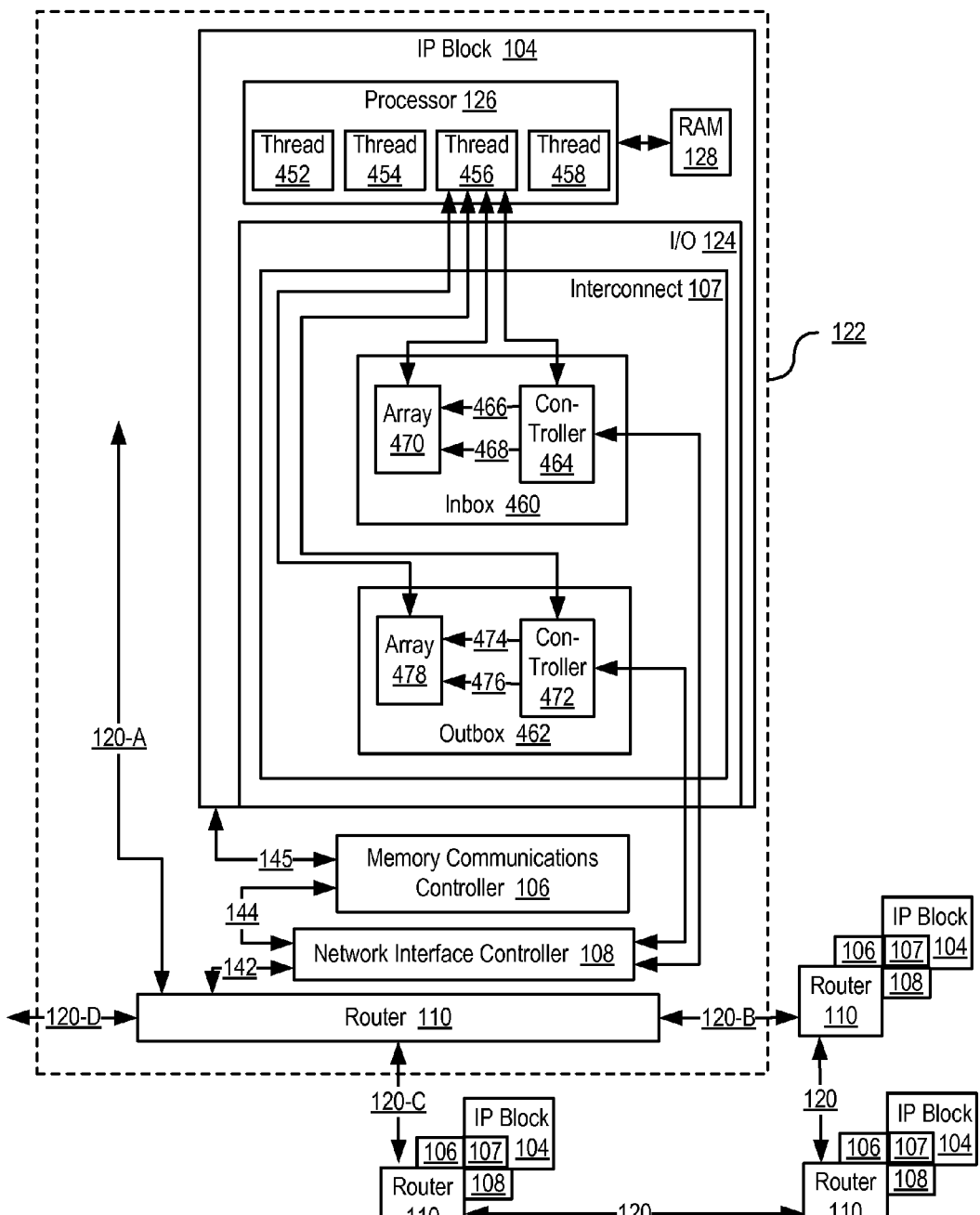
FIG. 4 sets forth a functional block diagram of a further example NOC according to embodiments of the present invention.

For further explanation, FIG. 4 sets forth a functional block diagram of a further example NOC according to embodiments of the present invention. The example NOC of FIG. 4 is similar to the example NOC of FIG. 2 in that the example NOC of FIG. 4 is implemented on a chip (100 on FIG. 2), and the NOC (102) of FIG. 4 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

The processor (126) in the example NOC of FIG. 4 includes a plurality of pipelined hardware threads (452, 454, 456, 458) of execution. The threads are 'pipelined' (452, 454, 456, 458) in that the processor is configured with execution units so that the processor can have under execution within the processor more than one instruction at the same time. The threads are hardware threads in that the support for the threads is built into the processor itself in the form of a separate architectural register set for each thread (452, 454, 456, 458), so that each thread can execute simultaneously with no need for context switches among the threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

In the example of FIG. 4, each IP block includes a low latency, high bandwidth application messaging interconnect (107) that adapts the IP block to the network for purposes of data communications among IP blocks. The low latency, high bandwidth application messaging interconnect (107) is an interconnect in the sense that it is composed of sequential and non-sequential logic that connects an IP block (104) to a network interface controller (108) for purposes of data communications. The low latency, high bandwidth application messaging interconnect (107) is a low latency, high bandwidth interconnect in that it provides a very fast interconnection between the IP block and the network interface controller—so fast because from the point of view of the IP block, for outgoing messages, the process of sending a message to the network interface controller represents a single immediate write to high speed local memory in the outbox array (478), and receiving a message in the IP block (104) from the network interface controller (108) represents a single read operation from a high speed local memory in the inbox array (470). As described in more detail below, each such messaging interconnect (107) includes an inbox (460) and an outbox (462). In the example of FIG. 4, one set (122) of an IP block (104) adapted to a router (110) through a memory communications controller (106) and network interface controller (108) is expanded to aid a more detailed explanation of the structure and operations of the messaging interconnect (107). All the IP blocks, memory communications controllers, network interface controllers, and routers in the example of FIG. 4 are configured in the same manner as the expanded set (122).

In the example NOC of FIG. 4, each outbox (462) includes an array (478) of memory indexed by an outbox write pointer (474) and an outbox read pointer (476). Each outbox (462) also includes an outbox message controller (472). In the example NOC of FIG. 4, the outbox has an associated thread of execution (456) that is a module of computer program instructions executing on a processor of the IP block. Each such associated thread of execution (456) is enabled to write message data into the array (478) and to provide to the outbox message controller (472) message control information, including message destination identification and an indication that message data in the array (478) is ready to be sent. The message control information, such as destination address or message identification, and other control information such as 'ready to send,' may be written to registers in the outbox message controller (472) or such information may be written into the array (478) itself as part of the message data, in a message header, message meta-data, or the like.

The outbox message controller (472) is implemented as a network of sequential and non-sequential logic that is enabled to set the outbox write pointer (474). The outbox write pointer (474) may be implemented, for example, as a register in the outbox message controller (472) that stores the memory address of the location in the array where the associated thread of execution is authorized to write message data. The outbox message controller (472) is also enabled to set the outbox read pointer (476). The outbox read pointer (476) may be implemented, for example, as a register in the outbox message controller (472) that stores the memory address of the location in the array where the outbox message controller is to read its next message data for transmission over the network from the outbox.

The outbox message controller (472) is also enabled to send to the network message data written into the array (478) by the thread of execution (456) associated with the outbox (462). In the NOC (102) of FIG. 4, each network interface controller (108) is enabled to convert communications instructions from command format to network packet format for transmission among the IP blocks (104) through routers (110). The communications instructions are formulated in command format by the associated thread of execution (456) in the IP block (104) and provided by the outbox message controller (472) to the network interface controller (108) in command format. The command format is a native format that conforms to architectural register files of the IP block (104) and the outbox message controller (472). The network packet format is the format required for transmission through routers (110) of the network. Each such message is composed of one or more network packets. Such communications instructions may include, for example, communications instructions that send messages among IP blocks carrying data and instructions for processing the data among IP blocks in parallel applications and in pipelined applications.

In the example NOC of FIG. 4, each inbox (460) includes an array (470) of memory indexed by an inbox write pointer (466) and an inbox read pointer (468). Each inbox (460) also includes an inbox message controller (464). The inbox message controller (464) is implemented as a network of sequential and non-sequential logic that is enabled to set the inbox write pointer (466). The inbox write pointer (466) may be implemented, for example, as a register in the inbox message controller (464) that stores the memory address of the beginning location in the array (470) where message data from an outbox of another IP block is to be written. The inbox message controller (464) is also enabled to set the inbox read pointer (468). The inbox read pointer (468) may be implemented, for example, as a register in the inbox message controller (464) that stores the memory address of the beginning location in the array (470) where an associated thread of execution (456) may read the next message received from an outbox of some other IP block.

In the example NOC of FIG. 4, the inbox has an associated thread of execution (456) that is a module of computer program instructions executing on a processor of the IP block. Each such associated thread of execution (456) is enabled to read from the array message data sent from some other outbox of another IP block. The thread of execution may be notified that message data sent from another outbox of another IP block has been written into the array by the message controller through a flag set in a status register, for example.

The inbox message controller (464) is also enabled to receive from the network message data written to the network from an outbox of another IP block and provide to a thread of execution (456) associated with the inbox (460) the message data received from the network. The inbox message controller of FIG. 4 receives from a network interface controller (108) message data from an outbox of some other IP block and writes the received message data to the array (470). Upon writing the received message data to the array, the inbox message controller (464) is also enabled to notify the thread of execution (456) associated with the inbox that message data has been received from the network by, for example, setting a data-ready flag in a status register of the inbox message controller (464). The associated thread of execution may, for example, 'sleep until flag' before a message load, or a load opcode can be configured to check a data-ready flag in the inbox message controller.

On a NOC according to embodiments of the present invention, computer software applications may be implemented as software pipelines. For further explanation, FIG. 5 sets forth a data flow diagram illustrating operation of an example pipeline (600). The example pipeline (600) of FIG. 5 includes three stages (602, 604, 606) of execution. A software pipeline is a computer software application that is segmented into a set of modules or 'stages' of computer program instructions that cooperate with one another to carry out a series of data processing tasks in sequence. Each stage in a pipeline is composed of a flexibly configurable module of computer program instructions identified by a stage ID with each stage executing on a thread of execution on an IP block on a NOC. The stages are 'flexibly configurable' in that each stage may support multiple instances of the stage, so that a pipeline may be scaled by instantiating additional instances of a stage as needed depending on workload.

Figure 5:
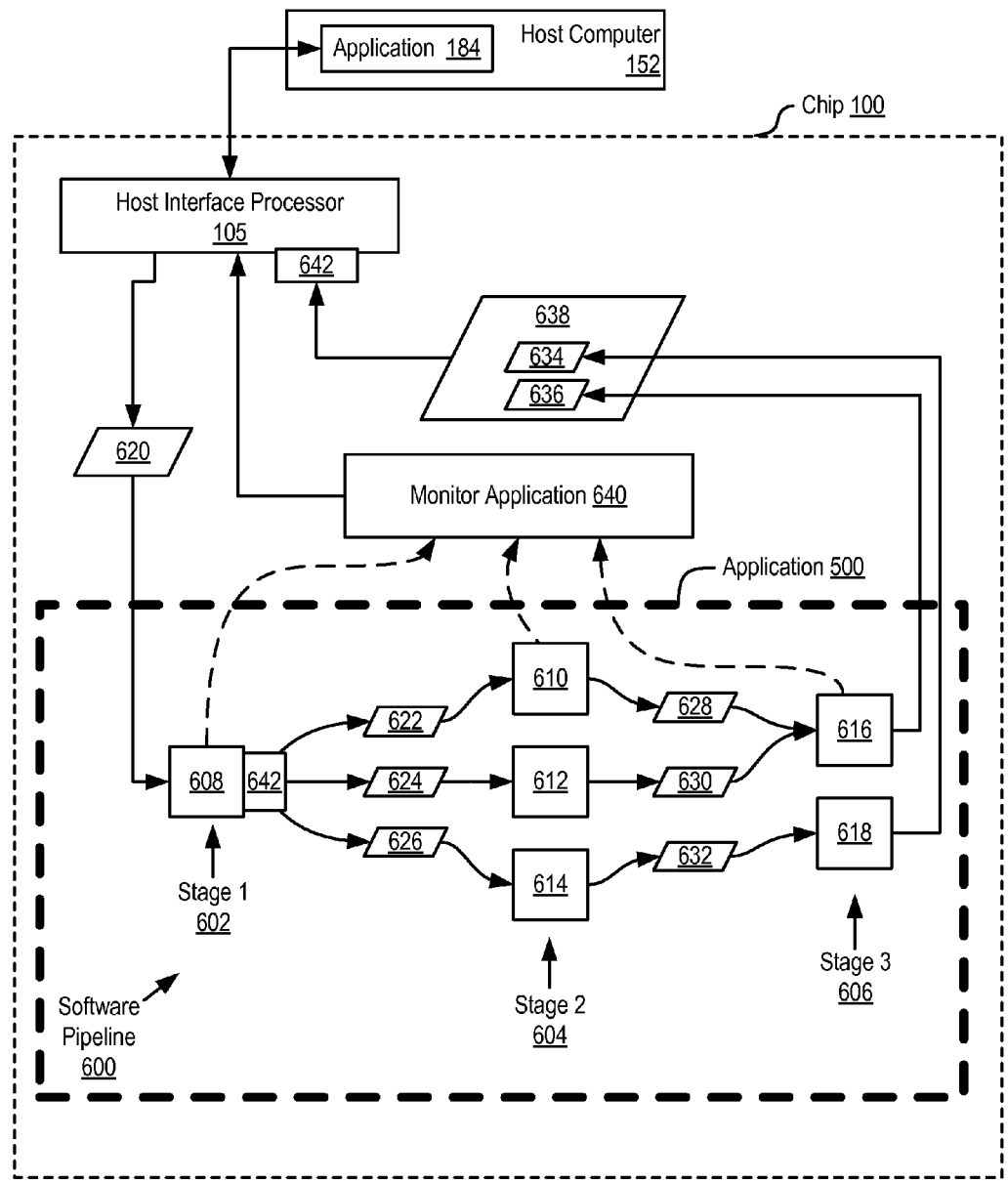
FIG. 5 sets forth a data flow diagram of an example software pipeline on a NOC according to embodiments of the present invention.

Because each stage (602, 604, 606) is implemented by computer program instructions executing on an IP block (104 on FIG. 2) of a NOC (102 on FIG. 2), each stage (602, 604, 606) is capable of accessing addressed memory through a memory communications controller (106 on FIG. 2) of an IP block—with memory-addressed messages as described above. At least one stage, moreover, sends network-address based communications among other stages, where the network-address based communications maintain packet order. In the example of FIG. 5, both stage 1 and stage 2 send network-address based communications among stages, stage 1 sending network address based communications (622-626) from stage 1 to stage 2, stage 2 sending network addressed communications (628-632) to stage 3.

The network-address based communications (622-632) in the example of FIG. 5 maintain packet order. Network-address based communications among stages of a pipeline are all communications of a same type which therefore flow through the same virtual channel as described above. Each packet in such communications is routed by a router (110 on FIG. 3) according to embodiments of the present invention, entering and leaving a virtual channel buffer (134 on FIG. 3) in sequence, in FIFO order, first-in, first-out, thereby maintaining strict packet order. Maintaining packet order in network address based communications according to the present invention provides message integrity because the packets are received in the same order in which they are—eliminating the need for tracking packet sequence in a higher layer of the data communication protocol stack. Contrast the example of TCP/IP where the network protocol, that is, the Internet Protocol, not only makes no undertaking regarding packet sequence, but in fact normally does deliver packets out of order, leaving it up to the Transmission Control Protocol in a higher layer of the data communication protocol stack to put the packets in correct order and deliver a complete message to the application layer of the protocol stack.

Each stage implements a producer/consumer relationship with a next stage. Stage 1 receives work instructions and work piece data (620) through a host interface processor (105) from an application (184) running on a host computer (152). Stage 1 carries out its designated data processing tasks on the work piece, produces output data, and sends the produced output data (622, 624, 626) to stage 2, which consumes the produced output data from stage 1 by carrying out its designated data processing tasks on the produced output data from stage 1, thereby producing output data from stage 2, and sends its produced output data (628, 630, 632) to stage 3, which in turn consumes the produced output data from stage 2 by carrying out its designated data processing tasks on the produced output data from stage 2, thereby producing output data from stage 3, which then stores its produced output data (634, 636) in an output data structure (638) for eventual return through the host interface processor (105) to the originating application program (184) on the host computer (152).

The return to the originating application program is said to be 'eventual' because quite a lot of return data may need to be calculated before the output data structure (638) is ready to return. The pipeline (600) in this example is represented with only six instances (622-632) in three stages (602-606). Many pipelines according to embodiments of the present invention, however, may includes many stages and many instances of stages. In an atomic process modeling application, for example, the output data structure (638) may represent the state at a particular nanosecond of an atomic process containing the exact quantum state of billions of sub-atomic particles, each of which requires thousands of calculations in various stages of a pipeline. Or in a video processing application, for a further example, the output data structure (638) may represent a video frame composed of the current display state of thousands of pixels, each of which requires many calculations in various stages of a pipeline.

Each instance (622-632) of each stage (602-606) of the pipeline (600) is implemented as an application-level module of computer program instructions executed on a separate IP block (104 on FIG. 2) on a NOC (102 on FIG. 2). Each stage is assigned to a thread of execution on an IP block of a NOC. Each stage is assigned a stage ID, and each instance of a stage is assigned an identifier. The pipeline (600) is implemented in this example with one instance (608) of stage 1, three instances (610, 612, 614) of stage 2, and two instances (616, 618) of stage 3. Stage 1 (602, 608) is configured at start-up by the host interface processor (105) with the number of instances of stage 2 and the network location of each instance of stage 2. Stage 1 (602, 608) may distribute its resultant workload (622, 624, 626) by, for example, distributing it equally among the instances (610-614) of stage 2. Each instance (610-614) of stage 2 is configured at start up with the network location of each instance of stage 3 to which an instance of stage 2 is authorized to send its resultant workload. In this example, instances (610, 612) are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

In the example of FIG. 5, where a computer software application (500) is segmented into stages (602-606), each stage may be configured with a stage ID for each instance of a next stage. That a stage may be configured with a stage ID means that a stage is provided with an identifier for each instance of a next stage, with the identifier stored in memory available to the stage. Configuring with identifiers of instances of next stage can include configuring with the number of instances of a next states as well as the network location of each instance of a next stage, as mentioned above. The single instance (608) of stage 1, in the current example, may be configured with a stage identifier or 'ID' for each instance (610-614) of a next stage, where the 'next stage' for stage 1, of course, is stage 2. The three instances (610-614) of stage 2 each may be configured with a stage ID for each instance (616, 618) of a next stage, where the next stage for stage 2 naturally is stage 3. And so on, with stage 3 in this example representing the trivial case of a stage having no next stage, so that configuring such a stage with nothing represents configuring that stage with the stage ID of a next stage.

Configuring a stage with IDs for instances of a next stage as described here provides the stage with the information needed to carry out load balancing across stages. In the pipeline of FIG. 5, for example, where a computer software application (500) is segmented into stages, the stages are load balanced with a number of instances of each stage in dependence upon the performance of the stages. Such load balancing can be carried out, for example, by monitoring the performance of the stages and instantiating a number of instances of each stage in dependence upon the performance of one or more of the stages. Monitoring the performance of the stages can be carried out by configuring each stage to report performance statistics to a monitoring application (640) that in turn is installed and running on another thread of execution on an IP block or host interface processor. Performance statistics can include, for example, time required to complete a data processing task, a number of data processing tasks completed within a particular time period, and so on, as will occur to those of skill in the art.

Instantiating a number of instances of each stage in dependence upon the performance of one or more of the stages can be carried out by instantiating, by a host interface processor (105), a new instance of a stage when monitored performance indicates a need for a new instance. As mentioned, instances (610, 612) in this example are both configured to send their resultant workloads (628, 630) to instance (616) of stage 3, whereas only one instance (614) of stage 2 sends work (632) to instance (618) of stage 3. If instance (616) becomes a bottleneck trying to do twice the workload of instance (618), an additional instance of stage 3 may be instantiated, even in real time at run time if needed.

In a NOC where a computer software application (500) is segmented into stages (602-606), at least one of the IP blocks of the NOC may implement an I/O accelerator (642). Such an I/O accelerator (642) administers at least some data communications traffic to and from the at least one IP block. Consider as an example an I/O accelerator (642) implemented on the IP block on which the instance (608) of stage 1 (602) is operating. Such an I/O accelerator (642) may perform multiple load operations of data from RAM on that IP block, formulate the loaded data into a plurality of messages according to an application pipeline protocol, and send the plurality of messages through an outbox of that IP block according to the application pipeline protocol to the many instances (610, 612, 614) of stage 2. Consider as another example, an accelerator (642) implemented in an IP block on which the host interface processor (105) is executing. Such an I/O accelerator (642) may, in accordance with an application pipeline protocol, receive a plurality of messages through an inbox implemented in the IP block in which the host interface processor (105) is executing, convert data from the messages from message format to I/O format, and perform multiple store operations of the converted data, where the converted data is stored in RAM at a location from which the host interface processor may use the data. These are but two examples of using an I/O accelerator according to embodiments of the present invention in a software pipeline (600), but readers of skill in the art will recognize that an I/O accelerator according to embodiments of the present invention may be implemented on any IP block executing an instance of any stage in the pipeline.

Figure 6:
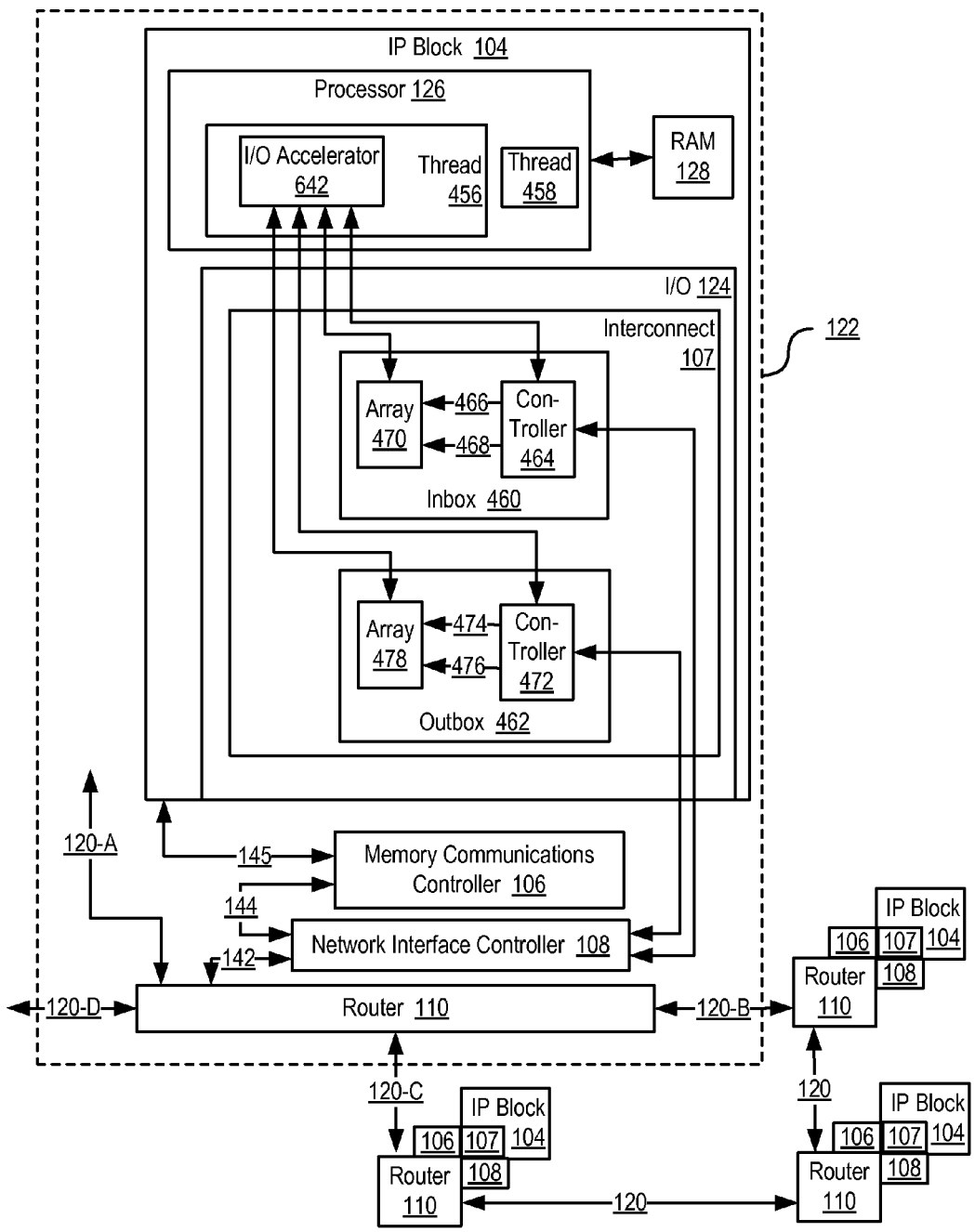
FIG. 6 sets forth a functional block diagram of a further example NOC according to embodiments of the present invention.

For further explanation, FIG. 6 sets forth a functional block diagram of a further example NOC according to embodiments of the present invention. The example NOC of FIG. 6 is similar to the example NOC of FIG. 4 in that the example NOC of FIG. 6 is implemented on a chip (100 on FIG. 2), and the NOC (102) of FIG. 6 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 6, each IP block also includes a low latency, high bandwidth application messaging interconnect (107) that adapts the IP block to the network for purposes of data communications among IP blocks.

The NOC of FIG. 6 differs from the NOC of FIG. 4, however, in that an input/output ('I/O') accelerator (642) is implemented as a software program executing in a hardware thread (456) in the processor (126). In the NOC of FIG. 6, the I/O accelerator (642) administers at least some data communications traffic to and from the at least one IP block. That is, the I/O accelerator (642) in the NOC of FIG. 6 is adapted to the network through an inbox (460) and outbox (462) of a low latency, high bandwidth application messaging interconnect (107), where the inbox (460) includes an inbox memory controller (464) and an array (470) of memory indexed by an inbox write pointer (466) and an inbox read pointer (468) and the outbox (462) includes an outbox memory controller (472) and an array (478) of memory indexed by an outbox write pointer (474) and outbox read pointer (476). Although the I/O accelerator (642) in the example of FIG. 6 is implemented as software program executing in a hardware thread of execution, readers of skill in the art will immediately recognize that an I/O accelerator may also be implemented as hardware aggregation of sequential and non-sequential logic separate from the processor (126) in the IP block (104) where the I/O accelerator has its own processor and is adapted to the network through a low latency, high bandwidth application messaging interconnect (107).

In the NOC of FIG. 6, the I/O accelerator (642), implemented either as a software program executing in a hardware thread of execution or as a hardware aggregation of sequential and non-sequential logic, may be configured to function in response to a single operation code ('opcode') executed on a thread of execution on a processor in an IP block (104) that includes the I/O accelerator (642), to receive a plurality of messages through an inbox (460) in accordance with an application pipeline protocol, convert data from the messages from message format to I/O format, and perform multiple store operations of the converted data.

An 'opcode,' or operation code, is the portion of a machine language instruction that specifies the operation to be performed. An opcode's specification and format are typically defined by the instruction set architecture of the particular processor for which the opcode is to be used. Apart from the opcode itself, an instruction normally also has one or more specifiers for operands, such as data, on which the operation should be performed, although some operations may have implicit operands, or none at all. Depending on architecture, the operands may be register values, values in the stack, other memory values, I/O ports, and so on, specified and accessed using addressing modes. The types of operations include arithmetic, data copying, logical operations, and program control, as well as special instructions.

An opcode that causes an I/O accelerator (642) to receive a plurality of messages through an inbox (460) in accordance with an application pipeline protocol, convert data from the messages from message format to I/O format, and perform multiple store operations of the converted data may include any of the following example opcodes expressed in pseudo-assembly language:

ARI
   In this example, 'ARI' is an opcode specifying an accelerated read from an inbox, where the I/O accelerator is configured with a designated storage location in RAM (128) to which data from the inbox is to be stored, and configured with an amount of data to store in RAM (128), such as, for example 1 kilobyte.

ARI Addr, Int
   In this example, 'ARI' is an opcode specifying an accelerated read from an inbox, the 'Addr' operand specifies a beginning address in RAM (128) in which to store data from the inbox, and 'Int' is an integer value that specifies a size of message data the I/O accelerator will store in RAM, such as 1 kilobyte, for example.

ARI Addr, Addr
   In this example, 'ARI' is an opcode specifying an accelerated read from an inbox, the first 'Addr' operand specifies a beginning address in RAM (128) in which to store data from the inbox, and the second 'Addr' operand specifies the extent of memory in which the I/O accelerator (642) is to store data from the inbox, that is, the I/O accelerator is to fill a segment of memory beginning at the address specified by the first 'Addr' operand and ending at the address specified by the second 'Addr' operand.

ARI Int, Addr
   In this example, 'ARI' is an opcode specifying an accelerated read from an inbox, the 'Int' operand is an integer value that specifies a thread ID of a thread from which originated message data in the inbox array that the I/O accelerator is to store in RAM (128), the I/O accelerator effectively ignoring message data from other threads, and the 'Addr' operand specifies a beginning address in RAM (128) in which to store the data.

ARI Int
   In this example, 'ARI' is an opcode specifying an accelerated read from an inbox and the 'Int' operand is an integer value that specifies a thread ID of a thread that caused the issuance of the opcode. In this example, the I/O accelerator may be configured with designated storage locations in memory for particular threads, as well as other parameters such as, for example, the size of data to store in memory.

These examples are said to be 'pseudo' assembler because they are explanatory examples in the form of assembly language rather than instructions from an actual assembly language. Only five combinations of example opcodes and operands useful in data processing on a NOC in accordance with embodiments of the present invention are described above for clarity, not limitation. Readers of skill in the art will recognize that many other combinations of such opcodes and operands may be useful in data processing on a NOC in accordance with embodiments of the present invention and as such many complimentary configurations of an I/O accelerator may also be useful.

An application pipeline protocol is a convention or standard that controls or enables the connection, communication, and data transfer between stages in an application pipeline. Such a protocol may define the syntax, semantics, and synchronization of communication between the stages. Receiving a plurality of messages through an inbox (460) in accordance with an application pipeline protocol therefore may include, as just one example, establishing a connection with a previous stage in a pipeline and instructing the previous stage that the I/O accelerator is ready to receive messages through its inbox. Such a connection may be established in a manner similar to the exchange of a "SYN" and "SYN ACK" used to establish communications between network nodes according to the transmission control protocol ('TCP') or in other ways as will occur to those of skill in the art. The application pipeline protocol may also define message size, packet size, header size, header contents, and so on as will occur to those of skill in the art. If an I/O accelerator is configured to store in RAM a particular amount of message data, say 1 kilobyte of message data, for example, receiving a plurality of messages through an inbox (460) in accordance with an application pipeline protocol may include establishing a connection with a previous stage in an software pipeline, receiving a particular number of packets, including header packets having no message data, that is equivalent to 1 kilobyte of message data, then terminating the connection with the previous stage in the software pipeline. These are just two examples of receiving a plurality of messages in accordance with an application pipeline protocol but readers of skill in the art will recognize that many variations of receiving a plurality of messages in accordance with an application pipeline protocol may exist and each such variation is well within the scope of the present invention.

Message format as the term is used in this specification is the format of message data as it is stored in an inbox or outbox for later consumption by a thread associated with the inbox or outbox. I/O format is the format of message data as it stored in memory for use by a thread. Message format may include, for example, header information as well as payload data. Such header information may include, for example, an identification of a destination thread, an identification of a source thread, a processor ID, and IP block ID, a number of packets making up the message, a size of the message, a size of the packet, a checksum value, and so on as will occur to those of skill in the art. Converting data from the messages from message format to I/O format may include stripping from the contents of an inbox array (470) such header information from the message data, leaving only the payload data of the message.

Performing multiple store operations of the converted data may include storing, by the I/O accelerator, only the payload data of one or more messages into RAM (128). Performing multiple store operations of the converted data may include, reporting, as a return of the opcode, that the operations carried out by the I/O accelerator are complete, the memory addresses used for storing the converted data, and so on. Such memory addresses used for storing the converted data may include addresses identifying various unique locations in memory in which the converted data was stored, such as for example, multiple individual, non-contiguous memory addresses. Such memory addresses used for storing the converted data may also include, for example, a beginning address of a range of addresses in which a predetermined size of converted data is stored, such as, for example, a beginning address of a 10 kilobyte range of addresses in RAM in which converted data is stored. Such memory addresses used for storing the converted data may also include, for example, a base an offset address, the base address defining the beginning of a segment of memory in which converted data is stored, the offset address defining the extent of the segment of memory in which the converted data is stored.

In the NOC of FIG. 6, the I/O accelerator (642) may also be implemented as an aggregation of sequential and non-sequential logic configured to function in response to a single opcode executed on a thread of execution on a processor in the at least one IP block (104) that comprises the I/O accelerator (642) to perform multiple load operations of data from memory, formulate the loaded data into a plurality of messages according to an application pipeline protocol, and send the plurality of messages through an outbox according to the application pipeline protocol.

An opcode that causes the I/O accelerator (642) to perform multiple load operations of data from memory, formulate the loaded data into a plurality of messages according to an application pipeline protocol, and send the plurality of messages through an outbox according to the application pipeline protocol may include any of the following example opcodes expressed in pseudo-assembly language:

AWO
   In this example, 'AWO' is an opcode specifying an accelerated write to an outbox, where the I/O accelerator is configured with a designated storage location in RAM (128) and predetermined size of message payload data to load data into the outbox array (478), such as for example, a 1 kilobyte chunk of data beginning at memory address 0x0000. The message data itself may include a destination address and other control information for the messages the I/O accelerator will formulate and send through the outbox.

AWO Addr, Int
   In this example, 'AWO' is an opcode specifying an accelerated write to an outbox, the 'Addr' operand specifies a beginning address in RAM (128) from which to retrieve data to be stored in the outbox, and 'Int' is an integer value that specifies a size of message data the I/O accelerator will store in the outbox, such as 1 kilobyte, for example.

AWO Addr, Addr
   In this example, 'AWO' is an opcode specifying an accelerated write to an outbox, the first 'Addr' operand specifies a beginning address of a segment of memory in RAM (128) from which to retrieve data to be stored in the outbox, and the second 'Addr' operand specifies the extent of segment of memory from which to retrieve data to be stored in the outbox.

AWO Int, Addr
   In this example, 'AWO' is an opcode specifying an accelerated write to an outbox, the 'Int' operand is an integer value that specifies a thread ID of a thread from which originated message data in the RAM (128) that is to be stored in the outbox, and the 'Addr' operand specifies a beginning address in RAM (128) from which to retrieve data to be stored in the outbox. Data in RAM to be stored in the outbox in this example may include a thread ID of a thread that originated the data.

AWO Int
   In this example, 'AWO' is an opcode specifying an accelerated write to an outbox and the 'Int' operand is an integer value that specifies a thread ID of a thread that caused the issuance of the opcode. In this example, the I/O accelerator may be configured with designated storage locations in memory for particular threads from which to retrieve data to be stored in the outbox, as well as other parameters such as, for example, the size of data to store in memory.

The I/O accelerator (642) may perform multiple load operations of data from memory by loading the data from RAM (128) to architectural registers associated with the I/O accelerator (642). If the I/O accelerator (642) is implemented as a thread executing on a processor (126) the I/O accelerator is associated with a set of architectural registers in the processor (126). If the I/O accelerator is implemented as a separate aggregation of logic including a processor, the data from RAM (128) may be loaded into the architectural registers of the processor.

Formulating the loaded data into a plurality of messages according to an application pipeline protocol may include adding appropriate header information, such as a source thread ID, destination thread ID, stage ID, IP block ID and so on, organizing the data into packets of a particular size, organizing the order of packets, organizing the packets into messages of a particular size, and so on as will occur to those of skill in the art.

Sending the plurality of messages through an outbox (462) according to the application pipeline protocol may include loading the plurality of messages into an outbox array (470) according to the current value of the outbox write pointer (476), establishing communications with a destination thread, such as a next stage in an application pipeline, and instructing the controller to send the messages.

Figure 7:
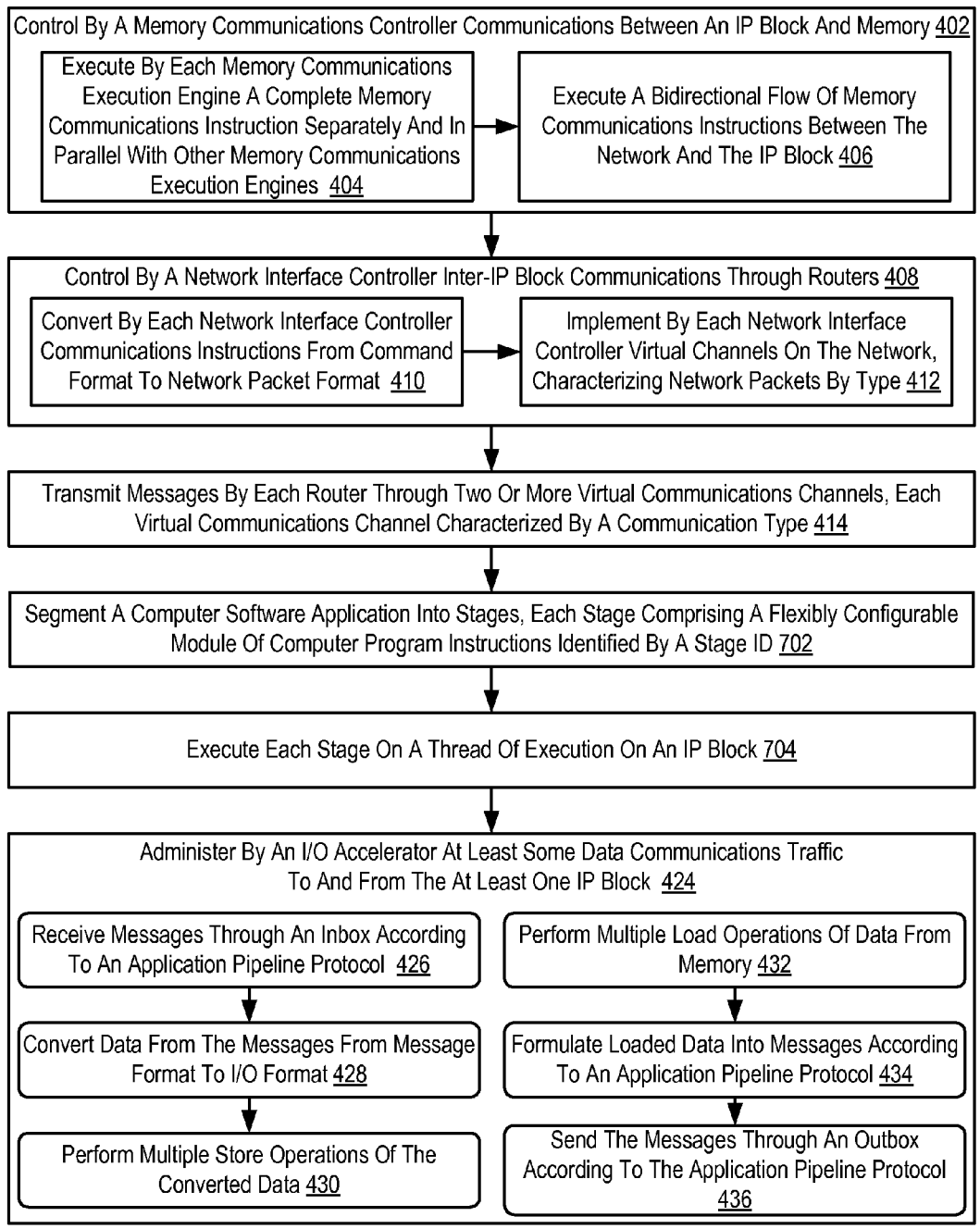
FIG. 7 sets forth a flow chart illustrating an example method for data processing with a NOC according to embodiments of the present invention.

For further explanation, FIG. 7 sets forth a flow chart illustrating an example method for data processing with a NOC according to embodiments of the present invention. The method of FIG. 7 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 7, each IP block may be implemented as a reusable unit of synchronous or asynchronous logic design used as a building block for data processing within the NOC.

The method of FIG. 7 includes controlling (402) by a memory communications controller (106 on FIG. 3) communications between an IP block and memory. In the method of FIG. 7, the memory communications controller includes a plurality of memory communications execution engines (140 on FIG. 3). Also in the method of FIG. 7, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 7, memory communications instructions may include translation lookaside buffer control instructions, cache control instructions, barrier instructions, memory load instructions, and memory store instructions. In the method of FIG. 7, memory may include off-chip main RAM, memory connected directly to an IP block through a memory communications controller, on-chip memory enabled as an IP block, and on-chip caches.

The method of FIG. 7 also includes controlling (408) by a network interface controller (108 on FIG. 3) inter-IP block communications through routers. In the method of FIG. 7, controlling (408) inter-IP block communications also includes converting (410) by each network interface controller communications instructions from command format to network packet format and implementing (412) by each network interface controller virtual channels on the network, including characterizing network packets by type.

The method of FIG. 7 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

The method of FIG. 7 also includes segmenting (702) a computer software application into stages, each stage comprising a flexibly configurable module of computer program instructions identified by a stage ID and executing (704) each stage on a thread of execution on an IP block.

The method of FIG. 7 also includes administering (424) by the I/O accelerator at least some data communications traffic to and from the at least one IP block. In the method of FIG. 7, administering (424) by the I/O accelerator at least some data communications traffic to and from the at least one IP block may be carried out, in response to a single opcode executed on a thread of execution on a processor in the at least one IP block that includes the I/O accelerator, by: receiving (426) a plurality of messages through an inbox according to an application pipeline protocol; converting (428) data from the messages from message format to I/O format; and performing (430) multiple store operations of the converted data. Administering (424) by the I/O accelerator at least some data communications traffic to and from the at least one IP block, in the method of FIG. 7, may also be carried out, in response to a single opcode executed on a thread of execution on a processor in the at least one IP block that includes the I/O accelerator by: performing (432) multiple load operations of data from memory; formulating (434) loaded data into a plurality of messages according to an application pipeline protocol; and sending (436) the plurality of messages through an outbox according to the application pipeline protocol.

Figure 8:
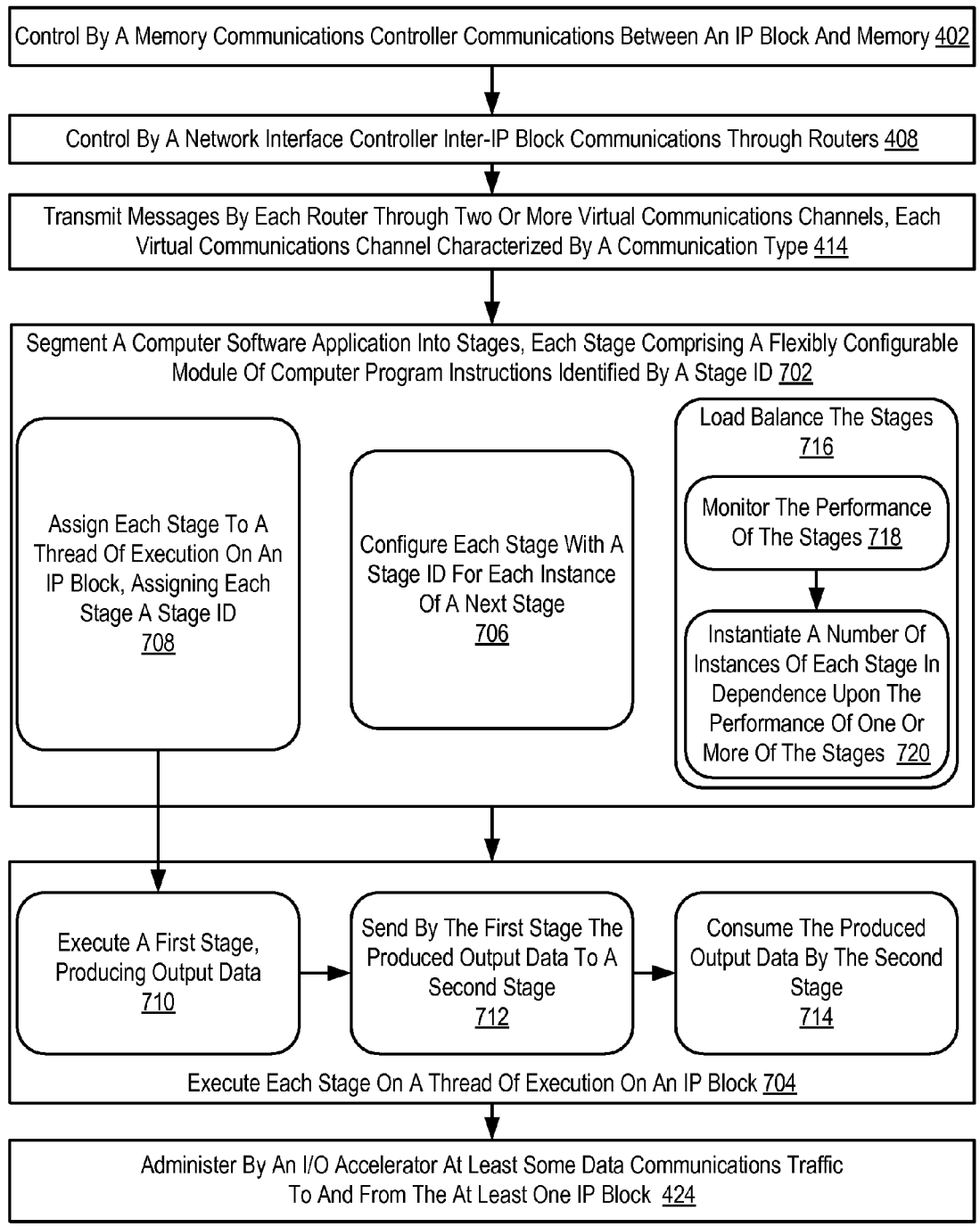
FIG. 8 sets forth a flow chart illustrating a further example method for data processing with a NOC according to embodiments of the present invention.

For further explanation, FIG. 8 sets forth a flow chart illustrating a further example method for data processing with a NOC according to embodiments of the present invention. The method of FIG. 8, like the method of FIG. 7, is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 7, each IP block may be implemented as a reusable unit of synchronous or asynchronous logic design used as a building block for data processing within the NOC.

The method of FIG. 8 is similar to the method of FIG. 7 including, as it does, controlling (402) by each memory communications controller communications between an IP block and memory; controlling (408) by each network interface controller inter-IP block communications through routers; segmenting (702) a computer software application into stages, each stage comprising a flexibly configurable module of computer program instructions identified by a stage ID; executing (704) each stage on a thread of execution on an IP block; and administering (424) by the I/O accelerator at least some data communications traffic to and from the at least one IP block.

The method of FIG. 8 differs from the method of FIG. 7, however, in that in the method of FIG. 8, segmenting (702) a computer software application into stages may be carried out by configuring (706) each stage with a stage ID for each instance of a next stage. In the method of FIG. 8, segmenting (702) a computer software application into stages also may include assigning (708) each stage to a thread of execution on an IP block, assigning each stage a stage ID. In such an embodiment, executing (704) each stage on a thread of execution on an IP block may include: executing (710) a first stage, producing output data; sending (712) by the first stage the produced output data to a second stage; and consuming (714) the produced output data by the second stage. In the method of FIG. 8, segmenting (702) a computer software application into stages also may include load balancing (716) the stages, carried out by monitoring (718) the performance of the stages and instantiating (720) a number of instances of each stage in dependence upon the performance of one or more of the stages.

Figure 9:
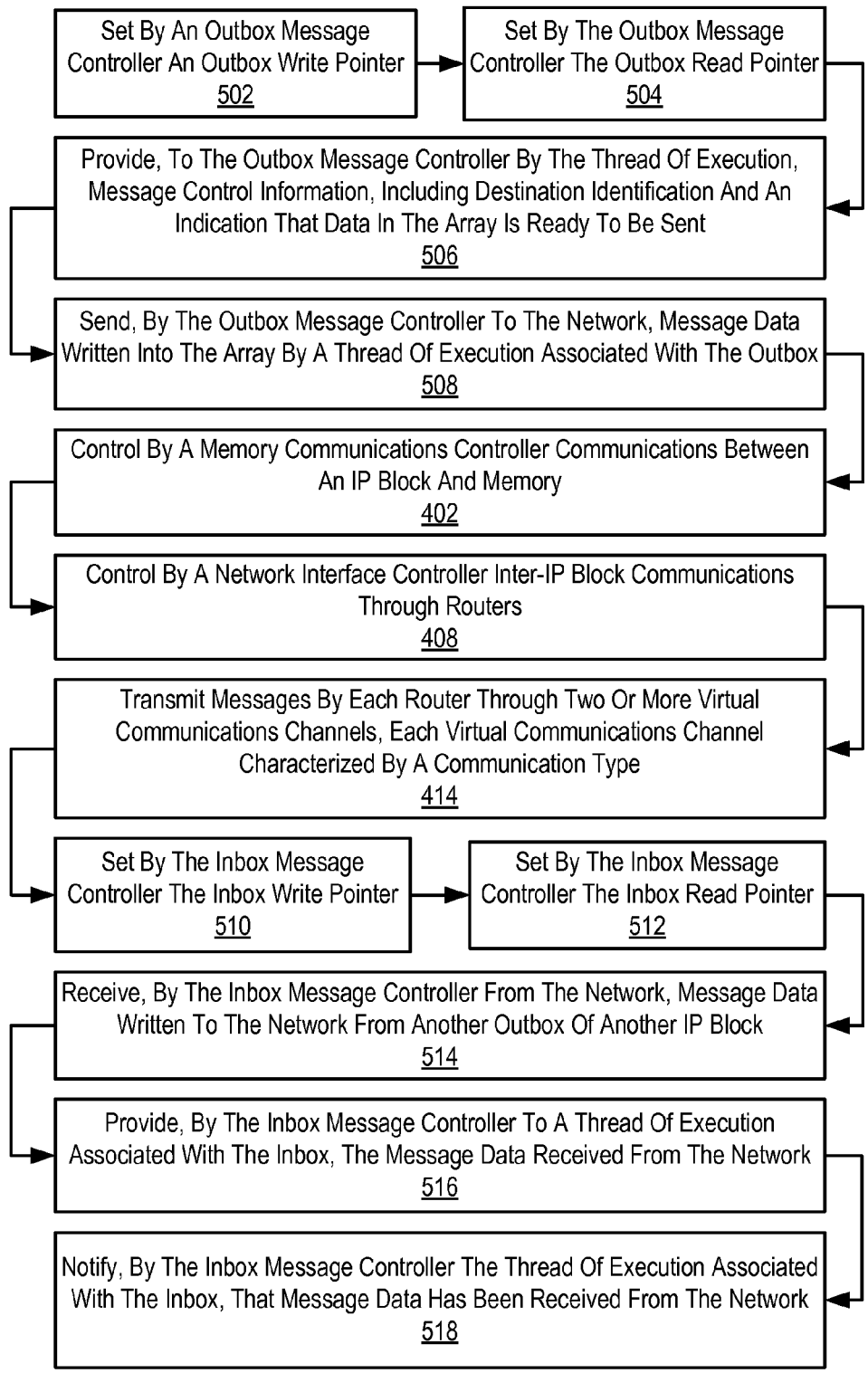
FIG. 9 sets forth a flow chart illustrating a further example method for data processing with a NOC according to embodiments of the present invention.

For further explanation, FIG. 9 sets forth a flow chart illustrating a further example method for data processing with a NOC according to embodiments of the present invention. The method of FIG. 9 is similar to the method of FIG. 7 in that the method of FIG. 9 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3).

In the method of FIG. 9, each IP block (104 on FIG. 3) may be implemented as a reusable unit of synchronous or asynchronous logic design used as a building block for data processing within the NOC, and each IP block is also adapted to the network by a low latency, high bandwidth application messaging interconnect (107 on FIG. 4) comprising an inbox (460 on FIG. 4) and an outbox (462 on FIG. 4). In the method of FIG. 9, each outbox (462 on FIG. 4) includes an outbox message controller (472 on FIG. 4) and an array (478 on FIG. 4) for storing message data, with the array indexed by an outbox write pointer (474 on FIG. 4) and an outbox read pointer (476 on FIG. 4). In the method of FIG. 9, each inbox (460 on FIG. 4) includes an inbox message controller (464 on FIG. 4) and an array (470 on FIG. 4) for storing message data, with the array (470 on FIG. 4) indexed by an inbox write pointer (466 on FIG. 4) and an inbox read pointer (468 on FIG. 4).

The method of FIG. 9, like the method of FIG. 7, includes the following method steps which operate in a similar manner as described above with regard to the method of FIG. 7: controlling (402) by each memory communications controller communications between an IP block and memory, controlling (408) by each network interface controller inter-IP block communications through routers, and transmitting (414) messages by each router (110 on FIG. 3) through two or more virtual communications channels, where each virtual communications channel is characterized by a communication type.

In addition to its similarities to the method of FIG. 7, however, the method of FIG. 9 also includes setting (502) by the outbox message controller the outbox write pointer. The outbox write pointer (474 on FIG. 4) may be implemented, for example, as a register in the outbox message controller (472 on FIG. 4) that stores the memory address of the location in the array where the associated thread of execution is authorized to write message data.

The method of FIG. 9 also includes setting (504) by the outbox message controller the outbox read pointer. The outbox read pointer (476 on FIG. 4) may be implemented, for example, as a register in the outbox message controller (472 on FIG. 4) that stores the memory address of the location in the array where the outbox message controller is to read its next message data for transmission over the network from the outbox.

The method of FIG. 9 also includes providing (506), to the outbox message controller by the thread of execution, message control information, including destination identification and an indication that data in the array is ready to be sent. The message control information, such as destination address or message identification, and other control information such as 'ready to send,' may be written to registers in the outbox message controller (472 on FIG. 4) or such information may be written into the array (478 on FIG. 4) itself as part of the message data, in a message header, message meta-data, or the like.

The method of FIG. 9 also includes sending (508), by the outbox message controller to the network, message data written into the array by a thread of execution associated with the outbox. In the NOC upon which the method of FIG. 9 is implemented, each network interface controller (108 on FIG. 4) is enabled to convert communications instructions from command format to network packet format for transmission among the IP blocks (104 on FIG. 4) through routers (110 on FIG. 4). The communications instructions are formulated in command format by the associated thread of execution (456 on FIG. 4) in the IP block (104 on FIG. 4) and provided by the outbox message controller (472 on FIG. 4) to the network interface controller (108 on FIG. 4) in command format. The command format is a native format that conforms to architectural register files of the IP block (104 on FIG. 4) and the outbox message controller (472 on FIG. 4). The network packet format is the format required for transmission through routers (110 on FIG. 4) of the network. Each such message is composed of one or more network packets. Such communications instructions may include, for example, communications instructions that send messages among IP blocks carrying data and instructions for processing the data among IP blocks in parallel applications and in pipelined applications.

The method of FIG. 9 also includes setting (510) by the inbox message controller the inbox write pointer. The inbox write pointer (466 on FIG. 4) may be implemented, for example, as a register in the inbox message controller (464 on FIG. 4) that stores the memory address of the beginning location in the array (470 on FIG. 4) where message data from an outbox of another IP block is to be written.

The method of FIG. 9 also includes setting (512) by the inbox message controller the inbox read pointer. The inbox read pointer (468 on FIG. 4) may be implemented, for example, as a register in the inbox message controller (464 on FIG. 4) that stores the memory address of the beginning location in the array (470 on FIG. 4) where an associated thread of execution (456 on FIG. 4) may read the next message received from an outbox of some other IP block.

The method of FIG. 9 also includes receiving (514), by the inbox message controller from the network, message data written to the network from another outbox of another IP block, and providing (516), by the inbox message controller to a thread of execution associated with the inbox, the message data received from the network. The inbox message controller (464 on FIG. 4) is enabled to receive from the network message data written to the network from an outbox of another IP block and provide to a thread of execution (456 on FIG. 4) associated with the inbox (460 on FIG. 4) the message data received from the network. The inbox message controller of FIG. 4 receives from a network interface controller (108 on FIG. 4) message data from an outbox of some other IP block and writes the received message data to the array (470 on FIG. 4).

The method of FIG. 9 also includes notifying (518), by the inbox message controller the thread of execution associated with the inbox, that message data has been received from the network. Upon writing the received message data to the array, an inbox message controller (464 on FIG. 4) is also enabled to notify the thread of execution (456 on FIG. 4) associated with the inbox that message data has been received from the network by, for example, setting a data-ready flag in a status register of the inbox message controller (464 on FIG. 4). The associated thread of execution may, for example, 'sleep until flag' before a message load, or a load opcode can be configured to check a data-ready flag in the inbox message controller.

Example embodiments of the present invention are described largely in the context of a fully functional computer system for data processing on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A network on chip ('NOC') comprising:
   IP blocks, routers, memory communications controllers, and network interface controllers; each IP block adapted to a router through a memory communications controller and a network interface controller; each memory communications controller for controlling communication between an IP block and memory; each network interface controller for controlling inter-IP block communications through said routers;
   each IP block adapted to the NOC by a low latency, high bandwidth application messaging interconnect comprising an inbox and an outbox;
   a computer software application segmented into stages, each stage comprising a flexibly configurable module of computer program instructions identified by a stage ID with each stage executing on a thread of execution on an IP block; and
   at least one of the IP blocks comprising an input/output ('I/O') accelerator configured to administer at least some data communications traffic to and from the at least one IP block,
   wherein the I/O accelerator further comprises:
   an aggregation of sequential and non-sequential logic configured to function in response to a single opcode executed on a thread of execution on a processor in the at least one IP block that comprises the I/O accelerator to receive a plurality of messages through the inbox in accordance with an application pipeline protocol, convert data from the messages from message format to I/O format, and perform multiple store operations of the converted data.

2. The NOC of claim 1 wherein the I/O accelerator further comprises:
   an aggregation of sequential and non-sequential logic configured to function in response to a single opcode executed on a thread of execution on a processor in the at least one IP block that comprises the I/O accelerator to perform multiple load operations of data from said memory, formulate the loaded data into a plurality of messages according to an application pipeline protocol, and send the plurality of messages through the outbox according to the application pipeline protocol.

3. The NOC of claim 1 wherein the computer software application segmented into stages further comprises the stages load balanced with a number of instances of each stage in dependence upon the performance of the stages.

4. The NOC of claim 1 wherein each outbox comprises an array indexed by an outbox write pointer and an outbox read pointer, the outbox further comprising an outbox message controller enabled to set the outbox write pointer, set the outbox read pointer, and send to the network message data written into the array by a thread of execution associated with the outbox.

5. The NOC of claim 4 wherein the thread of execution is enabled to provide message control information, including destination identification and an indication that data in the array is ready to be sent.

6. The NOC of claim 1 wherein each inbox comprises an array indexed by an inbox write pointer and an inbox read pointer, the inbox further comprising an inbox message controller enabled to set the inbox write pointer, set the inbox read pointer, receive from the network message data written to the network from another outbox of another IP block, and provide to a thread of execution associated with the inbox the message data received from the network.

7. The NOC of claim 6 wherein the inbox message controller is enabled to notify the thread of execution associated with the inbox that message data has been received from the network.

8. The NOC of claim 1 wherein each IP block comprises a reusable unit of synchronous or asynchronous logic design used as a building block for data processing within the NOC.

9. The NOC of claim 1 wherein each network interface controller is enabled to:
   convert communications instructions from command format to network packet format;
   and implement virtual channels on the network, characterizing network packets by type.

10. A method of data processing with a network on chip ('NOC'), the NOC comprising integrated processor ('IP') blocks, routers, memory communications controllers, and network interface controllers, each IP block adapted to a router through a memory communications controller and a network interface controller, each IP block adapted to the NOC by a low latency, high bandwidth application messaging interconnect comprising an inbox and an outbox, at least one of the IP blocks comprising an input/output ('I/O') accelerator, the method comprising:
    controlling by each memory communications controller communications between an IP block and memory;
    controlling by each network interface controller inter-IP block communications through said routers;
    segmenting a computer software application into stages, each stage comprising a flexibly configurable module of computer program instructions identified by a stage ID;
    executing each stage on a thread of execution on an IP block; and administering
    by the I/O accelerator at least some data communications traffic to and from the at least one IP block,
    wherein administering by the I/O accelerator at least some data communications traffic to and from the at least one IP block further comprises, in response to a single opcode executed on a thread of execution on a processor in the at least one IP block comprising the I/O accelerator:
    receiving a plurality of messages through the inbox according to an application pipeline protocol;
    converting data from the messages from message format to I/O format; and
    performing multiple store operations of the converted data.

11. The method of claim 10 wherein administering by the I/O accelerator at least some data communications traffic to and from the at least one IP block further comprises, in response to a single opcode executed on a thread of execution on a processor in the at least one IP block comprising the I/O accelerator:

performing multiple load operations of data from said memory;

formulating loaded data into a plurality of messages according to an application pipeline protocol; and sending the plurality of messages through the outbox according to the application pipeline protocol.

12. The method of claim 10 wherein segmenting a computer software application into stages further comprises configuring each stage with a stage ID for each instance of a next stage.

13. The method of claim 10 wherein each outbox comprises an array indexed by an outbox write pointer and an outbox read pointer, the outbox further comprises an outbox message controller, and the method further comprises:

setting by the outbox message controller the outbox write pointer;

setting by the outbox message controller the outbox read pointer; and sending, by the outbox message controller to the network, message data written into the array by a thread of execution associated with the outbox.

14. The method of claim 13 further comprising providing, to the outbox message controller by the thread of execution, message control information, including destination identification and an indication that data in the array is ready to be sent.

15. The method of claim 10 wherein each inbox comprises an array indexed by an inbox write pointer and an inbox read pointer, the inbox further comprising an inbox message controller, the method further comprising:

setting by the inbox message controller the inbox write pointer;

setting by the inbox message controller the inbox read pointer;

receiving, by the inbox message controller from the network, message data written to the network from another outbox of another IP block; and providing, by the inbox message controller to a thread of execution associated with the inbox, the message data received from the network.

16. The method of claim 15 further comprising notifying, by the inbox message controller the thread of execution associated with the inbox, that message data has been received from the network.

17. The method of claim 10 wherein each IP block comprises a reusable unit of synchronous or asynchronous logic design used as a building block for data processing within the NOC.

18. The method of claim 10 wherein controlling inter-IP block communications further comprises:

converting by each network interface controller communications instructions from command format to network packet format; and implementing by each network interface controller virtual channels on the network, characterizing network packets by type.

* * * * *